Jan. 7, 1958          E. H. SHAFF          2,818,893
POWER OPERATED MAGAZINE FED SCREW DRIVER
Filed May 31, 1956          2 Sheets-Sheet 1
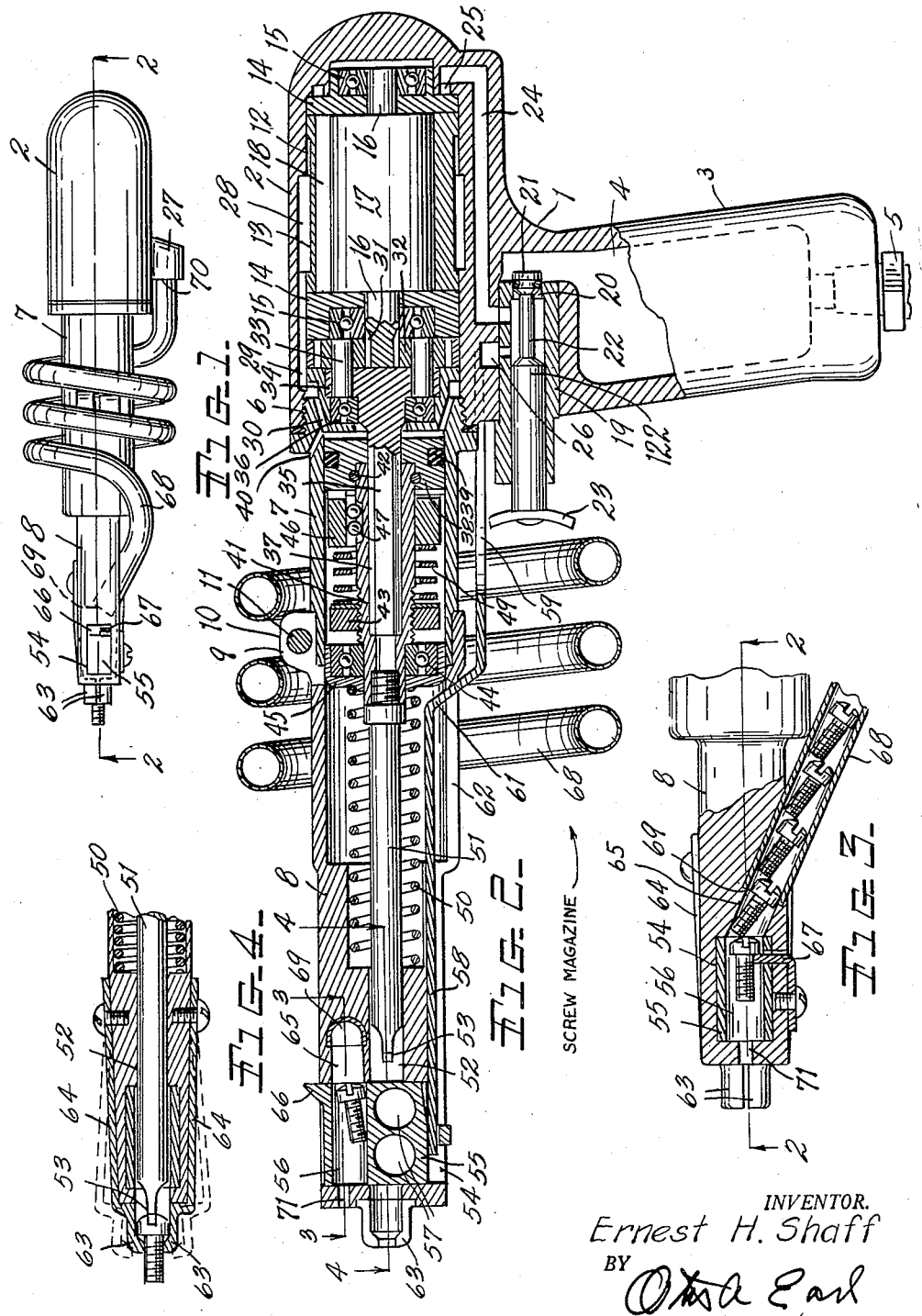
INVENTOR.
Ernest H. Shaff
BY
Attorney.

Jan. 7, 1958  E. H. SHAFF  2,818,893
POWER OPERATED MAGAZINE FED SCREW DRIVER
Filed May 31, 1956  2 Sheets-Sheet 2
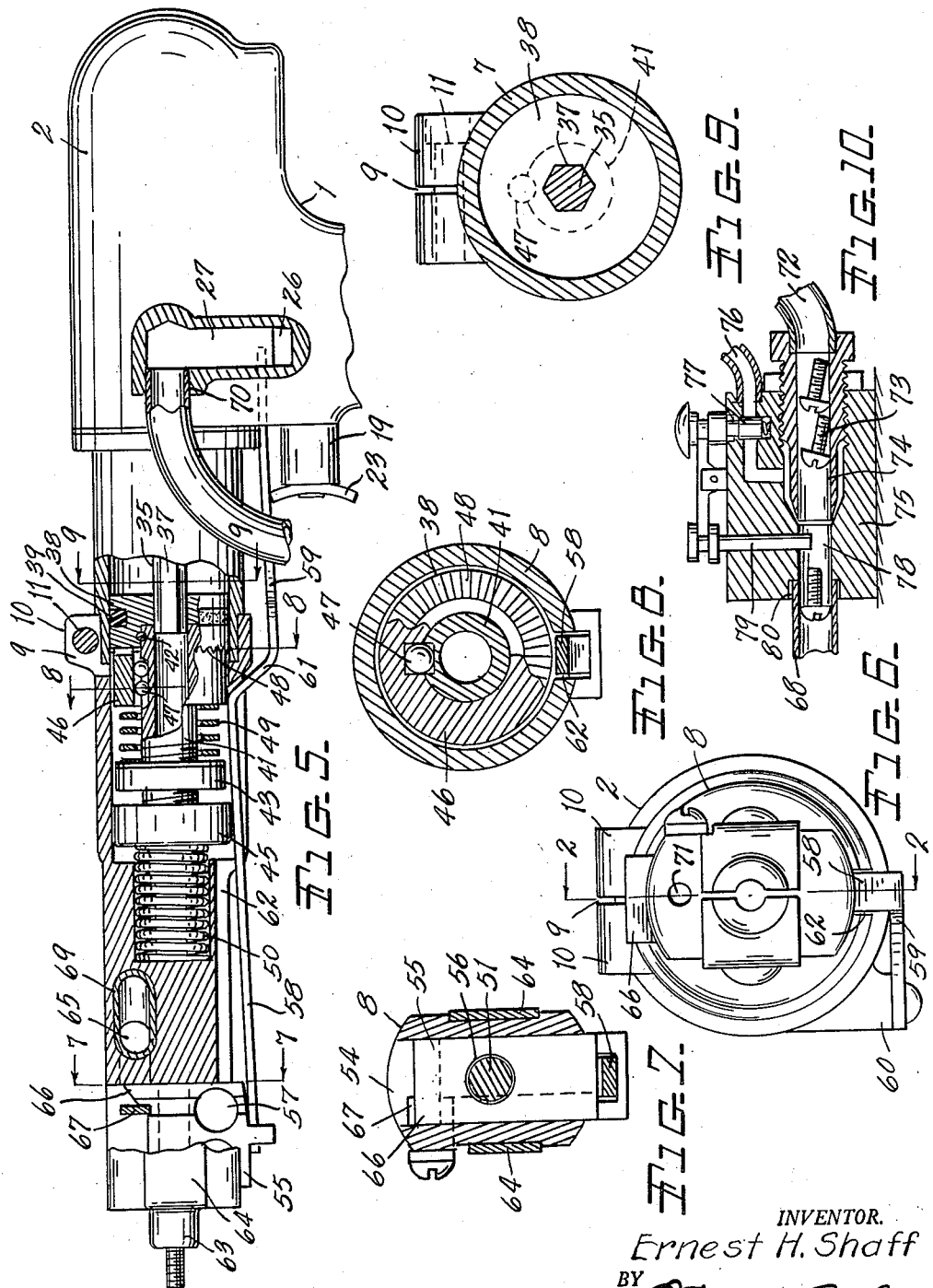
INVENTOR.
Ernest H. Shaff
BY
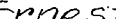
Attorney.

2,818,893
Patented Jan. 7, 1958

2,818,893
POWER OPERATED MAGAZINE FED SCREW DRIVER

Ernest H. Shaff, Lake Worth, Fla., assignor to The Aro Equipment Corporation, a corporation of Ohio Application May 31, 1956, Serial No. 588,295

13 Claims. (Cl. 144—32)

This invention relates to improvements in power operated magazine fed screw driver. The principal objects of this invention are:

First, to provide a practical power operated tool in the form of a magazine fed screw driver which will rapidly drive a screw by means of compressed air and automatically reload itself with succeeding screws from a magazine to repeat the screw driving operation.

Second, to provide an air operated screw driver in which the screws are fed or loaded successively into the tool from a storage magazine by means of air pressure.

Third, to provide an air operated screw driver in which a single manual trigger or control will automatically effect the loading of a screw into operative position, the advance of the screw driver bit and screw into operating position and rotation of the bit to drive the screw home.

Fourth, to provide a power operated screw driver having an axial extensible and rotatable bit driven through a clutch that automatically disengages the rotary driving power from the bit when the screw is completely driven into the work.

Fifth, to provide a novel form of magazine for an air operated screw driver which will hold a large supply of screws and which can be simply and rapidly loaded or charged with a supply of screws.

Sixth, to provide a novel form of driving clutch and bit advancing mechanism for an air operated screw driver having a minimum number of parts that are relatively easily assembled and which are effectively retained and guided to prevent misalignment and breakage of the parts.

Other objects and advantages of the invention will be apparent from a consideration of the following description and claims. The drawings, of which there are two sheets, illustrate a highly practical form of the screw driver and an example of a loading device for loading screws into the magazine of the tool.

Fig. 1 is a top plan view of the assembled screw driver.

Fig. 2 is a vertical longitudinal cross sectional view taken along the plane of the line 2—2 in Figs. 1 and 3 and illustrating the mechanism in retracted at rest position.

Fig. 3 is a fragmentary transverse cross sectional view taken along the plane of the line 3—3 in Fig. 2.

Fig. 4 is a fragmentary horizontal cross sectional view taken along the plane of the line 4—4 in Fig. 2 and illustrating the parts in advance screw driving position.

Fig. 5 is a fragmentary vertical cross sectional view similar to Fig. 2 but illustrating the mechanism in advanced operative position.

Fig. 6 is a fragmentary front elevational view of the screw driver.

Fig. 7 is a transverse cross sectional view taken along the plane of the line 7—7 in Fig. 5.

Fig. 8 is a transverse cross sectional view taken along the plane of the broken line 8—8 in Fig. 5.

Fig. 9 is a transverse cross sectional view taken along the plane of the line 9—9 in Fig. 5.

Fig. 10 is a fragmentary cross sectional view through a loading device for loading screws into the magazine of the screw driver.

The screw driver comprises a body 1 having a generally cylindrical motor housing 2 formed on the top and a hollow grip 3 formed on the bottom and defining an air inlet chamber 4 adapted to be connected to a source of air pressure by means of a flexible hose and coupling 5. The forward or left end of the motor housing 2 as shown in the drawings is open and internally threaded as at 6 to receive a generally cylindrical extension 7. The outer end of the extension 7 has a tubular tool guide neck 8 mounted thereon, the neck being slotted as at 9 and provided with ears 10 that are drawn together by the bolt 11 to clamp the neck to the extension.

The interior of the motor housing 2 defines a cylindrical chamber 12 within which a tubular motor cylinder is mounted. The ends of the motor cylinder 13 are closed by circular end plates 14 having bearings 15 mounted therein for rotatably supporting the drive shaft 16 of a rotor 17. The interior of the motor cylinder 13 defines an eccentric motor chamber 18 that receives the rotor in eccentric relation. The rotor 17 is provided with vanes that are not illustrated as rotary air motors of this type are well known.

A valve housing 19 projecting into the inlet chamber 4 defines a valve passage and port 20 opening to the inlet chamber and closed by the slidable valve 21. The stem 22 of the valve is of reduced cross section adjacent to the valve and extends forwardly to a trigger like finger piece 23 located in front of the grip. The passage 20 communicates through a passage 24 in the body with an annular inlet 25 to the motor chamber. The valve passage 20 also opens through a relatively restricted port 26 to a separate feed chamber 27 formed on the side of the body 2. Air exhaust from the motor chamber 18 is collected in an annular passage 28 around the motor cylinder and directed forwardly through the passages 29 and 30 to the rear end of the extension 7.

The front or left end of the rotor shaft 16 is splined or flatted as at 31 to drivingly engage a drive plate 32. The plate 32 is connected by rivets 33 to the flange 34 on the rear end of a drive spindle 35. The rear or inner end of the cylindrical extension 7 carries a further bearing 36 rotatably supporting and centering the spindle 35.

The left or projecting outer end of the spindle 35 is splined or flatted as at 37 to axially slidably and non-rotatably drivingly engage a driving clutch part 38. The driving clutch 38 has a piston-like sliding engagement within the cylindrical extension 7 and is sealed thereto by a rubber O-ring 39. The exhaust passages 30 from the air motor thus open to the rear face of the piston-like driving clutch part. The space behind the piston is vented to the atmosphere by a port 40 having less area than the passages 30.

Axially slidably and relatively rotatably sleeved around the flattened end 37 of the drive spindle is a tubular driven spindle 41. The rear end of the spindle 41 projects into the outer face of the driving clutch part 38 and is axially retained therein as by the snap ring 42. Towards its forward end the driven spindle 41 is exteriorly threaded to receive the adjustable abutment nut 43 and forwardly of the nut is passed rotatably through a centering bearing 44 and a hardened supporting cup 45. A driven clutch part 46 is axially slidably mounted around the inner end of the driven spindle and locked against rotation relative to the spindle by the balls 47. The axially opposed faces of the driving clutch member 38 and the driven clutch member 46 as appears in Fig. 5 have coacting radially serrated clutch faces 48. A helical spring 49 of flat stock is compressed between the abutment nut 43 and the driven clutch part 46 to bias the clutch parts toward engaged driving position.

The hardened centering cup 45 is slidable in both the cylindrical extension 7 and the guide neck 8 and a second helical spring 50 biases the cup 45 and through it the driven spindle 41 rearwardly. A tool bit 51 is threaded into the left or outer end of the driven spindle 41 and projects axially forwardly into a guide bore 52 in the outer end of the guide neck. The bit 51 has an outer tip 53 shaped to coact with the heads of the particular type of screws to be driven by the mechanism. The outer or left end of the guide neck 8 defines a vertically transverse passage 54 having flat side walls and transversely intersecting the guide bore 52. Vertically slidably mounted in the passage 54 is a rectangular block-like carriage 55 with an axially extending bore 56 formed through its upper portion to receive the screws to be driven. The transversely extending holes 57 are formed only to lighten the carriage block and do not enter into the operation of the apparatus.

The carriage block 55 is supported on its underside by a spring arm 58 that extends rearwardly along the underside of the guide neck 8 and the outer end of the tubular extension 7 where it is curved laterally as at 59 and extends rearwardly to an anchor 60 (see Fig. 6) on the lower side of the motor housing. The spring arm 58 has an upwardly extending portion 61 that projects upwardly through a slot 62 in the bottom of the guide neck and into the path of the hardened guide cup 45. It will thus be seen that advancing motion of the guide cup to the left as shown in Fig. 2 will engage and displace the upwardly extending portion 61 of the spring arm and simultaneously displace the carriage block 55 until the bore 56 in the carriage is aligned with the bore 52 in the guide neck. In this position of the carriage the tool bit 51 can be projected through the carriage to engage and advance a screw from the carriage bore into the work. Half round screw retaining jaws 63 are yieldably supported in front of the left end of the bore 52 by springable arms 64 secured to the sides of the guide neck to temporarily and yieldably support the screw being driven until the screw is advanced into the work. As appears most clearly in Fig. 4 the spring jaws 63 will open outwardly to pass the head of the screw at the end of the screw driving operation.

Screws are directed individually and successively to the bore 56 in the carriage block by entering through a forward hole 65 formed obliquely in the outer end of the guide neck above the tool guide bore 52. The hole 65 registers with the rear end of the screw receiving bore 56 in the carriage block when the carriage block is in retracted or raised position. The upper side of the carriage block has an extension 66 that blocks the feed hole when the carriage block is advanced into registry with the tool bore 52. In order to prevent more than one screw at a time entering the bore 56 from the feed hole 65 an angled stop 67 is secured to the side of the guide neck and projected through a slot in the side of the carriage block to intercept the heads of screws entering the carriage block.

Screws are directed automatically to the feed hole 65 by a spiral tubular magazine 68 which has its forward end 69 slidably and removably received in the feed hole. The magazine 68 is wrapped in spaced relationship around the guide neck and the tubular extension 7 of the body in order to provide increased length and capacity in the magazine and to provide sufficient springability and easy disengagement of the magazine from the feed hole 65. The rear end of the magazine 68 is received as at 70 in the previously described feed chamber 27. Air pressure admitted to the magazine from the feed chamber 27 effectively blows the screws in the magazine into the bore in the carriage block. In order that there will be no resistance to this movement of the air and screws through the magazine the extreme outer end of the guide neck is provided with an exhaust port 71 registering with the retracted position of the bore 56.

The magazine 68 is easily and quickly loaded or charged by means of a loading device such as is illustrated in Fig. 10. The loader consists of a supply tube 72 that may come from a manual or automatic screw orienting apparatus that directs screws successively and headfirst as at 73. The tube 72 delivers into a nozzle 74 threaded into a jet chamber in the loader block 75. Compressed air from the pipe 76 is admitted by the valve 77 to the jet chamber around the nozzle and functions to rapidly suck screws out of the nozzle and the tube and blow them into the outlet passage 78. A pin 79 coupled to the valve 77 prevents accidental discharge of the screws. The loader block 75 has a recess or socket 80 aligned with the outlet 78 and adapted to receive the front end of the magazine tube 68 that is applied to the loader for loading the magazine.

With the magazine 68 charged and with the apparatus in the position shown in Fig. 2 the operation of the screw driver is as follows. Retraction of the trigger 23 and valve stem 22 first opens the valve 21 and admits air pressure to both the motor chamber 18 and the inlet chamber 27. The air motor starts to rotate and one screw is blown from the magazine into the bore 56 in the retracted carriage block. Continued retraction of the trigger 23 causes the enlarged portion 122 of the valve stem to close off the air pressure from the magazine while continuing the supply to the motor. The exhaust from the motor chamber 18 is directed through the passages 28, 29 and 30 to the rear face of the driving clutch member 38 which thus is moved forwardly or advanced to the left while rotating with the drive spindle 35. The driving clutch member axially engages and advances the driven spindle 41 and the tool bit 51 and the spring 49 normally holds the clutch members 38 and 46 in engagement so both the driven spindle and the tool bit rotate with the motor. The advancing spindle 41 carries with it the hardened cup 45 that engages and depresses the raised portion 61 of the spring arm 58 so that the carriage block 55 is advanced to its lower registering position with the guide bore 52 in time for the advancing tip 53 of the bit to enter the bore 56 and pick up the screw in the carriage bore. As was previously explained the bit feeds the screw outwardly through the yieldable holding jaws 62 and turns the screw into the work. When the screw is completely seated in the work the resistance to rotation of the tool bit and the driven spindle 41 will cause the clutch parts 38 and 46 to automatically disengage and ratchet over each other so the operator will know when the screw is fully seated. The compression in the spring 49 will determine how tightly the screws are to be seated and this compression can be adjusted by means of the nut 43.

Having thus described the invention, what is claimed as new and is desired to be secured by Letters Patent is:

1. A power operated magazine fed screw driver comprising, a body forming a motor housing and a grip, a cylindrical extension on said body coaxial with said motor housing, a tool guide neck clamped to the end of and extending axially from said extension, an air motor in said housing having an axially fixed flatted shaft extending axially into said extension, an air inlet in said grip, a trigger operated inlet valve in said grip affording communication between said inlet and said motor, an outlet passage formed in said housing from said motor to the inner end of said extension, a driving clutch part having a piston-like sliding fit in said extension and a sliding and rotary driving connection on said shaft, a tool spindle having an axially slidable and relatively rotatable engagement with said shaft in front of said driving clutch part and abutted axially thereagainst, a snap ring axially retaining said spindle in engagement with said driving clutch part while permitting relative rotation therebetween, a driven clutch part having relatively axially slidable and non-rotatable driving engagement with said spindle and opposed to said driving clutch part, an adjusting nut threaded on said spindle, a first spring bearing between said nut and said driven clutch part to bias said clutch parts together, said clutch parts having opposed axially facing radially serrated coacting clutch faces, a hardened bearing cup axially slidably positioned in said extension and slidable into said tool guide neck, a bearing carried by said cup and rotatably centering said spindle in said extension, a second spring positioned in said neck and biasing said bearing cup rearwardly, a tool bit threadingly engaged in the end of said spindle and having a screw driver tip, the end of said neck having a bore therein axially receiving said bit and further defining a transverse flat sided passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck and said extension to a connection to said body to bias said carriage and the bore therein out of registry with the bore in the neck, said arm having a transverse offset projecting through a slot in said neck into the path of said bearing cup to be engaged by said bearing cup to move said arm and carriage and register the bore in the carriage with the bore in the neck, the outer end of said neck having a screw feed hole formed obliquely therein and opening to the bore in said carriage in the retracted position of the carriage, said passage having a projection therein extending into the bore in the carriage in the retracted position thereof to intercept and limit the entrance of one screw at a time into said carriage, said carriage having a portion blocking said screw feed hole in the advanced position of the carriage, laterally spreadably mounted screw retaining jaws at the outer end of said bore in said neck, a tubular spiral screw magazine having its outer end removably received in the rear end of the feed hole in said neck and having its rear end supported in a recess in the side of said body, an air passage formed in said body and opened to said inlet by said valve and extending to the rear end of said magazine, and a cut-off portion on said trigger valve arranged to block said last passage in the fully actuated position of said trigger, said body defining a restricted escape passage of smaller size than the outlet from the motor to behind said driving clutch part opening to the exterior of said body from behind said driving clutch part.

2. A power operated magazine fed screw driver comprising, a body forming a motor housing and a grip, a cylindrical extension on said body coaxial with said motor housing, a tool guide neck on the end of and extending axially from said extension, an air motor in said housing having an axially fixed flatted shaft extending axially into said extension, an air inlet in said grip, a trigger operated inlet valve in said grip affording communication between said inlet and said motor, an outlet passage formed in said housing from said motor to the inner end of said extension, a driving clutch part having a piston-like sliding fit in said extension and a sliding and rotary driving connection on said shaft, a tool spindle having an axially slidable and relatively rotatable engagement with said shaft in front of said driving clutch part and abutted axially thereagainst, means axially retaining said spindle in engagement with said driving clutch part while permitting relative rotation therebetween, a driven clutch part having relatively axially slidable and non-rotatable driving engagement with said spindle and opposed to said driving clutch part, an adjusting nut threaded on said spindle, a first spring bearing between said nut and said driven clutch part to bias said clutch parts together, said clutch parts having opposed axially facing radially serrated coacting clutch faces, a bearing cup axially slidably positioned in said extension and slidable into said tool guide neck, a bearing carried by said cup and rotatably centering said spindle in said extension, a second spring positioned in said neck and biasing said bearing cup rearwardly, a tool bit engaged in the end of said spindle and having a screw driver tip, the end of said neck having a bore therein axially receiving said bit and further defining a transverse flat sided passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck and said extension to a connection to said body to bias said carriage and the bore therein out of registry with the bore in the neck, said arm having a transverse offset projecting through a slot in said neck into the path of said bearing cup to be engaged by said bearing cup to move said arm and carriage and register the bore in the carriage with the bore in the neck, the outer end of said neck having a screw feed hole formed obliquely therein and opening to the bore in said carriage in the retracted position of the carriage, said carriage having a portion blocking said screw feed hole in the advanced position of the carriage, a tubular spiral screw magazine having its outer end removably received in the rear end of the feed hole in said neck and having its rear end supported in a recess in the side of said body, an air passage formed in said body and opened to said inlet by said valve and extending to the rear end of said magazine, and a cut-off portion on said trigger valve arranged to block said last passage in the fully actuated position of said trigger, said body defining a restricted escape passage of smaller size than the outlet from the motor to behind said driving clutch part opening to the exterior of said body from behind said driving clutch part.

3. A power operated magazine fed screw driver comprising, a body forming a motor housing and a grip, a tubular extension on said body coaxial with said motor housing, a tool guide neck on the end of and extending axially from said extension, an air motor in said housing having an axially fixed flatted shaft extending axially into said extension, an air inlet in said body, a trigger operated inlet valve in said body affording communication between said inlet and said motor, an outlet passage formed in said housing from said motor to the inner end of said extension, a driving clutch part having a piston-like sliding fit in said extension and a sliding and rotary driving connection on said shaft, a tool spindle having an axially slidable and relatively rotatable engagement with said shaft in front of said driving clutch part, means axially retaining said spindle in fixed axial relation with said driving clutch part while permitting relative rotation therebetween, a driven clutch part having relatively axially slidable and non-rotatable driving engagement with said spindle and opposed to said driving clutch part, a first spring bearing between said spindle and said driven clutch part to bias said clutch parts together, said clutch parts having opposed axially facing radially serrated coacting clutch faces, a bearing cup axially slidably positioned in said extension and slidable into said tool guide neck, a bearing carried by said cup and rotatably centering said spindle in said extension, a second spring positioned in said neck and biasing said bearing cup and spindle rearwardly, a tool bit engaged in the end of said spindle and having a screw driver tip, the end of said neck having a bore therein axially receiving said bit and further defining a transverse passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck to a connection to said body to bias said carriage and the bore therein out of registry with the bore in the neck, said arm having a transverse offset projecting through a slot in said neck into the path of said bearing cup to be engaged by said bearing cup to move said arm and carriage and register the bore in the carriage with the bore in the neck, the outer end of said neck having a screw feed hole formed obliquely therein and opening to the bore in said carriage in the retracted position of the carriage, said carriage having a portion blocking said screw feed hole in the advanced position of the carriage, a tubular spiral screw magazine having its outer end removably received in the rear end of the feed hole in said neck, and having its rear end supported in a recess in the side of said body, an air passage formed in said body and opened to said inlet by said valve and extending to the rear end of said magazine, and a cut-off portion on said trigger valve arranged to block said last passage in the fully actuated position of said valve, said body defining a restricted escape passage of smaller size than the outlet from the motor to behind said driving clutch part opening to the exterior of said body from behind said driving clutch part.

4. A power operated magazine fed screw driver comprising, a body forming a motor housing and a grip, a tubular extension on said body projecting from said motor housing, a tool guide neck extending axially from said extension, an air motor in said housing having an axially fixed shaft extending axially into said extension, an air inlet in said body, a manually operated inlet valve in said body affording communication between said inlet and said motor, an outlet passage formed in said housing from said motor to the inner end of said extension, a driving clutch part having a piston-like sliding fit in said extension and a sliding and rotary driving connection on said shaft, a tool spindle having an axially slidable and relatively rotatable engagement with said shaft in front of said driving clutch part, means axially retaining said spindle in fixed axial relation with said driving clutch part while permitting relative rotation therebetween a driven clutch part having relatively axially slidable and non-rotatable driving engagement with said spindle and opposed to said driving clutch part, a first spring bearing between said spindle and said driven clutch part to bias said clutch parts together, said clutch parts having opposed axially facing radially serrated coacting clutch faces, a bearing axially slidably positioned in said extension and rotatably centering said spindle in said extension, a second spring positioned in said neck and biasing said bearing and spindle rearwardly, a tool bit engaged in the end of said spindle and having a screw driver tip, the end of said neck having a bore therein axially receiving said bit and further defining a transverse passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck to a connection to said body to bias said carriage and the bore therein out of registry with the bore in the neck, said arm having a transverse offset projecting through a slot in said neck into the path of said bearing to be engaged by said bearing to move said arm and carriage and register the bore in the carriage with the bore in the neck, the outer end of said neck having a screw feed hole formed obliquely therein and opening to the bore in said carriage in the retracted position of the carriage, a tubular spiral screw magazine having its outer end removably received in the rear end of the feed hole in said neck and having its rear end supported in a recess in the side of said body, an air passage formed in said body and opened to said inlet by said valve and extending to rear end of said magazine, and a cut-off portion on said valve arranged to block said last passage in the fully actuated position of said valve.

5. A power operated magazine fed screw driver comprising, a body forming a motor housing and a grip, a tubular extension having an outer neck on said body, an air motor in said housing having a shaft extending axially into said extension, an air inlet in said body, a trigger operated inlet valve on said body in cooperative position relative to said grip affording communication between said inlet and said motor, an outlet passage formed in said housing from said motor to the inner end of said extension, a piston slidingly mounted in said extension and rotatably drivingly connected to said shaft, a tool bit slidably and rotatably guided in said neck, means axially drivingly connecting said piston to said bit, means including said piston forming a yieldingly disengageable automatic clutch connection between said shaft and said bit, a spring positioned in said neck and biasing said bit rearwardly, the end of said neck having a bore therein axially receiving said bit and further defining a transverse flat sided passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck and said extension to a connection to said body to bias said carriage and the bore therein out of registry with the bore in the neck, said arm having a transverse offset projecting through a slot in said neck into the path of a projection on said bit to be engaged thereby to move said arm and carriage and register the bore in the carriage with the bore in the neck, the outer end of said neck having a screw feed hole formed obliquely therein and opening to the bore in said carriage in the retracted position of the carriage, said passage having a projection therein extending into the bore in the carriage in the retracted position thereof to intercept and limit the entrance of one screw at a time into said carriage, said carriage having a portion blocking said screw feed hole in the advanced position of the carriage, laterally spreadably mounted screw retaining jaws at the outer end of said bore in said neck, a tubular spiral screw magazine having its outer end removably received in the rear end of the feed hole in said neck and having its rear end supported in a recess in the side of said body, an air passage formed in said body and opened to said inlet by said valve and extending to the rear end of said magazine, and a cut-off portion on said valve arranged to block said last passage in the fully actuated position of said valve, said body defining a restricted escape passage of smaller size than the outlet from the motor to behind said driving clutch part opening to the exterior of said body from behind said driving clutch part.

6. A power operated magazine fed screw driver comprising, a body forming a motor housing and a grip, a tubular extension having an outer neck on said body, an air motor in said housing having a shaft extending axially into said extension, an air inlet in said body, an inlet valve on said body in cooperative position relative to said grip affording communication between said inlet and said motor, an outlet passage formed in said housing from said motor to the inner end of said extension, a piston slidingly mounted in said extension, a tool bit slidably and rotatably guided in said neck and having a sliding and rotary driving connection to said shaft, means axially drivingly connecting said piston to said bit, a spring positioned in said neck and biasing said bit rearwardly, the end of said neck having a bore therein axially receiving said bit and further defining a transverse passage intersecting said bore near the outer end thereof and ahead of the retracted position of the outer end of said bit, a screw feed carriage transversely slidably positioned in said passage and defining an axially extending bore adapted to be brought into registry with said bore in said neck, a spring arm supporting said carriage in said passage and extending along said neck to a connection to said body to bias said carriage and the bore therein out of registry with the bore in the neck, said arm having a transverse offset projecting through a slot in said neck into the path of a projection on said bit to be engaged thereby to move said arm and carriage and register the bore in the carriage with the bore in the neck, the outer end of said neck having a screw feed hole formed therein and opening to the bore in said carriage in the retracted position of the carriage, laterally spreadably mounted screw retaining jaws at the outer end of said bore in said neck, a tubular spiral screw magazine having its outer end removably received in the rear end of the feed hole in said neck and having its rear end supported in a recess in the side of said body, an air passage formed in said body and opened to said inlet by said valve and extending to the rear end of said magazine, and a cut-off portion on said valve arranged to block said last passage in the fully actuated position of said valve.

7. In an air operated screw driver having a body with a neck and a grip, said neck defining bore for a tool bit and a transverse passage intersecting said bore adjacent the outer end thereof, an air motor in said body, a tool bit rotatable and slidable in said bore between an extended position and a retracted position inwardly of said passage, means including an automatically disengageable clutch drivingly connecting said motor to said bit, piston means in said body connected to said bit to advance the same, spring means connected to retract said bit, an air inlet passage having a manually operable valve therein formed in said body and opening to said motor, an outlet passage formed in said body from said motor to said piston means to advance said bit, a screw feed carriage block slidable in said transverse passage and having a bore formed therein adapted to be advanced with the block into registry with the bore in said neck, a spring arm supporting said block and swingably connected to said body, a transverse off-set in said arm, a projection on said bit reciprocable therewith to engage said off-set to advance said block, a feed hole formed in said neck and and registering with the retracted position of the inner end of the bore in said block, a tubular spiral magazine wrapped around said neck and having its front end removably received in said feed hole to deliver thereto, the rear end of said magazine being received in said body, a feed passage formed in said body from said inlet to said magazine, and valve means opened momentarily upon opening said first valve positioned to control said feed passage.

8. In an air operated screw driver having a body with a neck and a grip, said neck defining bore for a tool bit and a transverse passage intersecting said bore adjacent the outer end thereof, a tool bit rotatable and slidable in said bore between an extended position and a retracted position inwardly of said passage, a motor in said body, means drivingly connecting said motor to said bit, piston means in said body connected to said bit to advance the same, spring means connected to retract said bit, an air inlet passage having a manually operable valve therein formed in said body and opening to said motor, an outlet passage formed in said body from said motor to said piston means to advance said bit, a screw feed carriage block slidable in said transverse passage and having a bore formed therein adapted to be advanced with the block into registry with the bore in said neck, an arm supporting said block and swingably connected to said body, a transverse off-set in said arm, a projection on said bit reciprocable therewith to engage said off-set to advance said block, a feed hole formed in said neck and registering with the retracted position of the bore in said block, a tubular spiral magazine wrapped around said neck and having its front end received in said feed hole to deliver thereto, the rear end of said magazine being received in said body, a feed passage formed in said body from said inlet to said magazine, and valve means positioned to control said feed passage.

9. In an air operated screw driver having a body with a neck and a grip, said neck defining bore for a tool bit and a transverse passage intersecting said bore adjacent the outer end thereof, a tool bit rotatable and slidable in said bore between an extended position and a retracted position inwardly of said passage, a motor in said body, means drivingly connecting said motor to said bit, piston means in said body connected to said bit to advance the same, spring means connected to retract said bit, an air inlet passage having a manually operable valve therein formed in said body and opening to said motor, a passage formed in said body from said inlet passage to said piston means to advance said bit, a screw feed carriage block slidable in said transverse passage and having a bore formed therein adapted to be advanced with the block into registry with the bore in said neck, an arm supporting said block and swingably connected to said body, a transverse off-set in said arm, a projection on said bit reciprocable therewith to engage said off-set to advance said block, a feed hole formed in said neck and registering with the retracted position of the bore in said block, a tubular spiral magazine wrapped around said neck and having its front end received in said feed hole to deliver thereto, the rear end of said magazine being received in said body, a feed passage formed in said body from said inlet to said magazine, and valve means positioned to control said feed passage.

10. In an air operated screw driver having a body with a neck and a grip, said neck defining bore for a tool bit and a transverse passage intersecting said bore adjacent the outer end thereof, a tool bit rotatable and slidable in said bore between an extended position and a retracted position inwardly of said passage, a motor in said body, means drivingly connecting said motor to said bit, piston means in said body in thrust transmitting relation to said bit to advance the same independently of said motor, spring means connected to retract said bit, an air inlet passage having a manually operable valve therein formed in said body and opening to said motor, a passage formed in said body from said inlet passage to said piston means to advance said bit, a screw feed carriage block slidable in said transverse passage and having a bore formed in said transverse passage and having a bore formed therein adapted to be advanced with the block into registry with the bore in said neck, means supporting said block and swingably connected to said body, coacting camming projections on said bit and said supporting means engageable in the advanced position of said bit to advance said block, a feed hole formed in said neck and registering with the retracted position of the bore in said block, a tubular spiral magazine wrapped around said neck and having its front end received in said feed hole to deliver thereto, the rear end of said magazine being received in said body, a feed passage formed in said body from said inlet to said magazine, and valve means operable with said first valve positioned to control said feed passage.

11. In an air operated screw driver having a body with a neck and a grip, said neck defining bore for a tool bit and a transverse passage intersecting said bore adjacent the outer end thereof, a tool bit rotatable and slidable in said bore between an extended position and a retracted position inwardly of said passage, a motor in said body, means drivingly connecting said motor to said bit, piston means in said body in thrust transmitting relation to said bit to advance the same, spring means connected to retract said bit, an air inlet passage having a manually operable valve therein formed in said body and opening to said motor, a passage formed in said body from said inlet passage to said piston means to advance said bit, a screw feed carriage block slidable in said transverse passage and having a bore formed therein adapted to be advanced with the block into registry with the bore in said neck, means supporting said block and swingably connected to said body, coacting camming projections on said bit and said supporting means engageable in the advanced position of said bit to advance said block, a feed hole formed in said neck and registering with the retracted position of the bore in said block, a tubular spiral magazine wrapped around said neck and having its front end received in said feed hole to deliver thereto, the rear end of said magazine being received in said body, a feed passage formed in said body from said inlet to said magazine, and valve means positioned to control said feed passage.

12. An air operated screw driver comprising a body with a grip, a neck on the end of said body, said neck defining bore for a tool bit and a transverse passage intersecting said bore adjacent the outer end thereof, an air motor in said body, a tool bit rotatable in said bore, means for relatively reciprocating said neck and bit between an extended position and a retracted position of the bit inwardly of said passage, means drivingly connecting said motor to said bit, an air inlet passage having a manually operable valve therein formed in said body and opening to said motor, a passage formed in said body from said inlet passage to said reciprocating means to relatively advance said bit, a screw feed carriage block slidable in said transverse passage and having a bore formed therein adapted to be advanced with the block into registry with the bore in said neck, means supporting said block for swinging motion relative to said body transversely in said transverse passage, coacting camming projections on said bit and said supporting means engageable in the advanced position of said bit to advance said block, a feed hole formed in said neck and registering with the retracted position of the bore in said block, a tubular spiral magazine wrapped around said neck and having its front end received in said feed hole to deliver thereto, the rear end of said magazine being received in said body, a feed passage formed in said body from said inlet to said magazine, and valve means positioned to control said feed passage.

13. An air operated screw driver comprising a body with a grip, a neck on the end of said body, said neck defining a bore for a tool bit and a feed hole intersecting the bore, an air motor in said body, a tool bit rotatable in said bore, means for relatively reciprocating said neck and bit between an extended position and a retracted position of the bit inwardly of said feed hole, means drivingly connecting said motor to said bit, an air inlet passage having a manually operable valve therein formed in said body and opening to said motor, a passage formed in said body from said inlet passage to said bit reciprocating means, a feed hole formed in said neck and opening to the bore in said neck, a tubular spiral magazine wrapped around said neck and having its front end received in said feed hole to deliver screws thereto, the rear end of said magazine being received in said body, air feed passage formed in said body from said inlet to said magazine, and valve means positioned to control said feed passage.

References Cited in the file of this patent

UNITED STATES PATENTS

| | | |
|---|---|---|
| 1,980,967 | DeMooy | Nov. 13, 1934 |
| 2,373,992 | Billinghurst | Apr. 17, 1945 |
| 2,471,793 | Stull | May 31, 1949 |
| 2,534,140 | Moore | Dec. 12, 1950 |
| 2,544,165 | Krasnow | Mar. 6, 1951 |
| 2,605,792 | Havener | Aug. 5, 1952 |
| 2,754,860 | Moore et al. | July 17, 1956 |